United States Patent
Hengsperger et al.

(10) Patent No.: US 7,513,278 B2
(45) Date of Patent: Apr. 7, 2009

(54) DRINKING WATER PITCHER HAVING A REMOVABLE UPPER RESERVOIR

(75) Inventors: Steve L. Hengsperger, Windsor (CA); Justin L. Namespetra, Essex (CA); Christopher B. Caldwell, Stoney Creek (CA); Richard S. Zulik, Beamsville (CA)

(73) Assignee: Tersano Inc., Oldcastle, ON ( * ) Notice: Subject to any disclaimer, the term of this patent is extended or adjusted under 35 U.S.C. 154(b) by 366 days.

(21) Appl. No.: 11/335,501

(22) Filed: Jan. 20, 2006

(65) Prior Publication Data

US 2006/0162806 A1 Jul. 27, 2006

Related U.S. Application Data

(60) Provisional application No. 60/645,072, filed on Jan. 21, 2005.

(51) Int. Cl.
*B67C 3/02* (2006.01)
*B67C 11/06* (2006.01)
*B67C 3/00* (2006.01)
*B01D 35/00* (2006.01)

(52) U.S. Cl. .................. 141/85; 141/335; 141/346; 210/282; 210/474

(58) Field of Classification Search ............ 141/85, 141/89, 331, 335, 346, 365, 363; 210/282, 210/474, 477
See application file for complete search history.

(56) References Cited

U.S. PATENT DOCUMENTS

| | | | |
|---|---|---|---|
| 4,623,457 A | 11/1986 | Hankammer | |
| 5,225,078 A | 7/1993 | Polasky et al. | |
| 5,308,482 A | 5/1994 | Mead | |
| 5,370,041 A * | 12/1994 | Lowe | 210/282 |
| 5,503,740 A | 4/1996 | Callaghan et al. | |
| 5,562,824 A | 10/1996 | Magnusson | |
| 5,637,214 A | 6/1997 | Kahana | |
| 5,830,360 A | 11/1998 | Mozayeni et al. | |
| 6,099,735 A * | 8/2000 | Kelada | 210/652 |
| 6,103,114 A | 8/2000 | Tanner et al. | |
| 6,178,290 B1 * | 1/2001 | Weyrauch et al. | 210/181 |
| 6,361,686 B1 * | 3/2002 | Conrad | 210/192 |
| 6,405,875 B1 | 6/2002 | Cutler | |
| 6,423,224 B1 | 7/2002 | Tanner et al. | |
| 6,524,477 B1 * | 2/2003 | Hughes | 210/282 |
| 6,649,045 B2 | 11/2003 | Tanner et al. | |
| 6,953,523 B2 * | 10/2005 | Vandenbelt et al. | 210/85 |

(Continued)

*Primary Examiner*—Timothy L Maust
*Assistant Examiner*—Nicolas A Arnett
(74) *Attorney, Agent, or Firm*—Curtis B. Behmann; Borden Ladner Gervais LLP

(57) ABSTRACT

A drinking water pitcher is provided including an upper reservoir and a lower reservoir, and preferably a filter or filter housing. The upper and lower reservoirs are removably mated with one another. The interface between the upper and lower reservoirs restricts or prevents water flow from the upper reservoir to the lower reservoir unless the reservoirs are properly mated/seated together, such as by a water restriction means in the upper reservoir. In another aspect, a drinking water purification system is provided including a base unit and a drinking water pitcher. The drinking water pitcher includes an upper reservoir, a lower reservoir and preferably a filter or a filter housing. The base unit can include a sanitization means. The upper and lower reservoirs are removably mated with one another, and the upper reservoir can be removably mated with the base unit. A method of purifying water is also described.

10 Claims, 15 Drawing Sheets

U.S. PATENT DOCUMENTS

| | | | |
|---|---|---|---|
| 2002/0066698 A1* | 6/2002 | Brunner | 210/474 |
| 2004/0134932 A1* | 7/2004 | Lobdell | 222/146.5 |
| 2005/0017380 A1* | 1/2005 | Namespetra et al. | 261/75 |
| 2006/0163169 A1* | 7/2006 | Eckhardt et al. | 210/748 |
| 2006/0163174 A1* | 7/2006 | Namespetra et al. | 210/760 |

* cited by examiner

DRINKING WATER PITCHER HAVING A REMOVABLE UPPER RESERVOIR

CROSS-REFERENCE TO RELATED APPLICATIONS

This application claims the benefit of priority of U.S. Provisional Patent Application Ser. No. 60/645,072, filed Jan. 21, 2005, which is incorporated herein by reference.

FIELD OF THE INVENTION

The present invention relates generally to drinking water pitchers. More particularly, the present invention relates to drinking water pitchers for water filtration/treatment, having an upper reservoir and a lower reservoir.

BACKGROUND OF THE INVENTION

Increased concern from the public on issues of water quality has resulted in an explosion of water filtration devices on the market, particularly for household use. A popular household water filtration device is in the style of a pour-through pitcher. Typically, unfiltered water is added to a basin at the top of the device. Through the action of gravity, water percolates through a filtering media (usually consisting of granulated activated carbon) located between the basin and a collection reservoir. Filtered water is then dispensed from the collection reservoir for drinking. For the general public, gravity-controlled pitcher-type water filtration systems are cost effective. Many such water filtration systems are provided under the Brita® and PUR® brand names.

There are many types of gravity flow water filters that focus primarily on the removal of harmful contaminants in drinking water such as chlorine and sediment. These tend to consist of an upper reservoir with a removable filter installed in it. This assembly is installed in a lower reservoir. The upper reservoir is filled with water and the water immediately begins to flow through the filter media. All the water flows through the filter and is deposited in the lower reservoir. This type of filtration method is common in the art.

However, most "Pitcher" style water filters are large and awkward to put in a standard kitchen or bathroom sink to be filled. There are some known approaches that provide a drinking water pitcher including removably mated upper and lower reservoirs. However, those approaches do not discuss the desire to be able to remove the upper reservoir without water escaping from it. Discussion relating to providing a seal in the drinking water pitcher is restricted to the function of making sure that a filter housing is properly sealed to the drinking water pitcher.

Another drawback of these inexpensive household products is that they are not very good at removing harmful bacteria and micro-biological organisms from the water and focus more on improving the taste and removing chemicals and sediments. A need has been identified to improve the purity of the filtered water by also removing harmful bacterial and microbiological organisms from water.

Some known drinking water systems include a further filtration or purification means after a first filtration. This additional filtration or purification means can be provided in a base unit, on which the drinking water pitcher can be placed. While some such approaches describe a receptacle that can mate with elements of the device in two different ways, it does not provide two distinct in-use positions for a removable water reservoir.

It is, therefore, desirable to provide a drinking water pitcher that overcomes at least one drawback of previous drinking water pitchers and/or systems.

SUMMARY OF THE INVENTION

It is an object of the present invention to obviate or mitigate at least one disadvantage of previous drinking water pitchers and/or systems.

In an aspect, the present invention provides a drinking water pitcher including an upper reservoir and a lower reservoir removably mated with one another. The upper reservoir includes a water restriction means to restrict water flow from the upper reservoir when the upper and lower reservoirs are not properly mated together.

The water restriction means can restrict, or prevent, water outflow from the upper reservoir when the upper reservoir is removed from the lower reservoir, and can be provided in a bottom surface of the upper reservoir. The water restriction means can be a valve, such as a dual check valve.

The bottom surface of the upper reservoir can be shaped to be removably mated with a top surface of the lower reservoir. The bottom surface of the upper reservoir and a top surface of the lower reservoir can be complementary in shape. The bottom surface of the upper reservoir mates with a top surface of the lower reservoir without substantial overlap of the upper reservoir within the lower reservoir. The upper and lower reservoirs can each include taper lock portions co-operating with each other to enable detachment of the upper reservoir from the lower reservoir via a twisting motion.

The drinking water pitcher can further include a drinking water filter. The lower reservoir can include a removable drinking water filter. The lower reservoir can include a filter housing for a drinking water filter, the filter housing in the lower reservoir being complementary in shape to the water restriction means in the upper reservoir.

The upper reservoir can further include a gripping means, which can include a closed gripping area. The upper reservoir can further include an upper reservoir handle, and the lower reservoir can further include a lower reservoir handle to mate with the upper reservoir handle.

The drinking water pitcher can further include a lid to mate with a top surface of the upper reservoir and/or with a top surface of the lower reservoir. The lid can include a gripping means.

In another aspect, the present invention provides a drinking water system including: a base unit; a lower reservoir removably mated with the base unit; and an upper reservoir having a first in-use position when removably mated with the lower reservoir and a second in-use position when removably mated directly with the base unit.

In a further aspect, the present invention provides a drinking water system including: a base unit and a drinking water pitcher. The drinking water pitcher includes a lower reservoir and an upper reservoir shaped to be removably mated with the lower reservoir and with the base unit.

The base unit can include a sanitizing means for sanitizing drinking water. The lower reservoir can include a filtering means for filtering drinking water. A base of the upper reservoir can include a mating structure to mate with a top surface of the lower reservoir, and to mate with a top surface of the base unit. A base of the lower reservoir can include a mating structure to mate with a top surface of the base unit.

The upper reservoir can further include a water restriction means to prevent water outflow from the upper reservoir when it is removed from the lower reservoir or from the base unit.

In embodiments of the drinking water system, the drinking water pitcher can have various features as previously described with respect to aspects of the drinking water pitcher embodiments.

In a further aspect, the present invention provides a method of purifying drinking water, including: sanitizing drinking water in a first reservoir while the first reservoir is removably mated with a base unit; and filtering the sanitized water as it passes from the first reservoir to a second reservoir to which it is removably mated. The step of sanitizing drinking water can include ozonating drinking water. The method can further include, prior to the step of filtering, the step of removing the first reservoir with sanitized water from the base unit to be removably mated on top-of the second reservoir.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a drinking water pitcher including an upper reservoir and a lower reservoir, and preferably a filter or filter housing. The upper and lower reservoirs are removably mated with one another. The interface between the upper and lower reservoirs restricts or prevents water flow from the upper reservoir to the lower reservoir unless the reservoirs are properly mated/seated together, such as by a water restriction means in the upper reservoir. In another aspect, a drinking water purification system is provided including a base unit and a drinking water pitcher. The drinking water pitcher includes an upper reservoir, a lower reservoir and preferably a filter or a filter housing. The base unit can include a sanitization means. The upper and lower reservoirs are removably mated with one another, and the upper reservoir can be removably mated with the base unit. A method of purifying water is also described.

Figure 1:
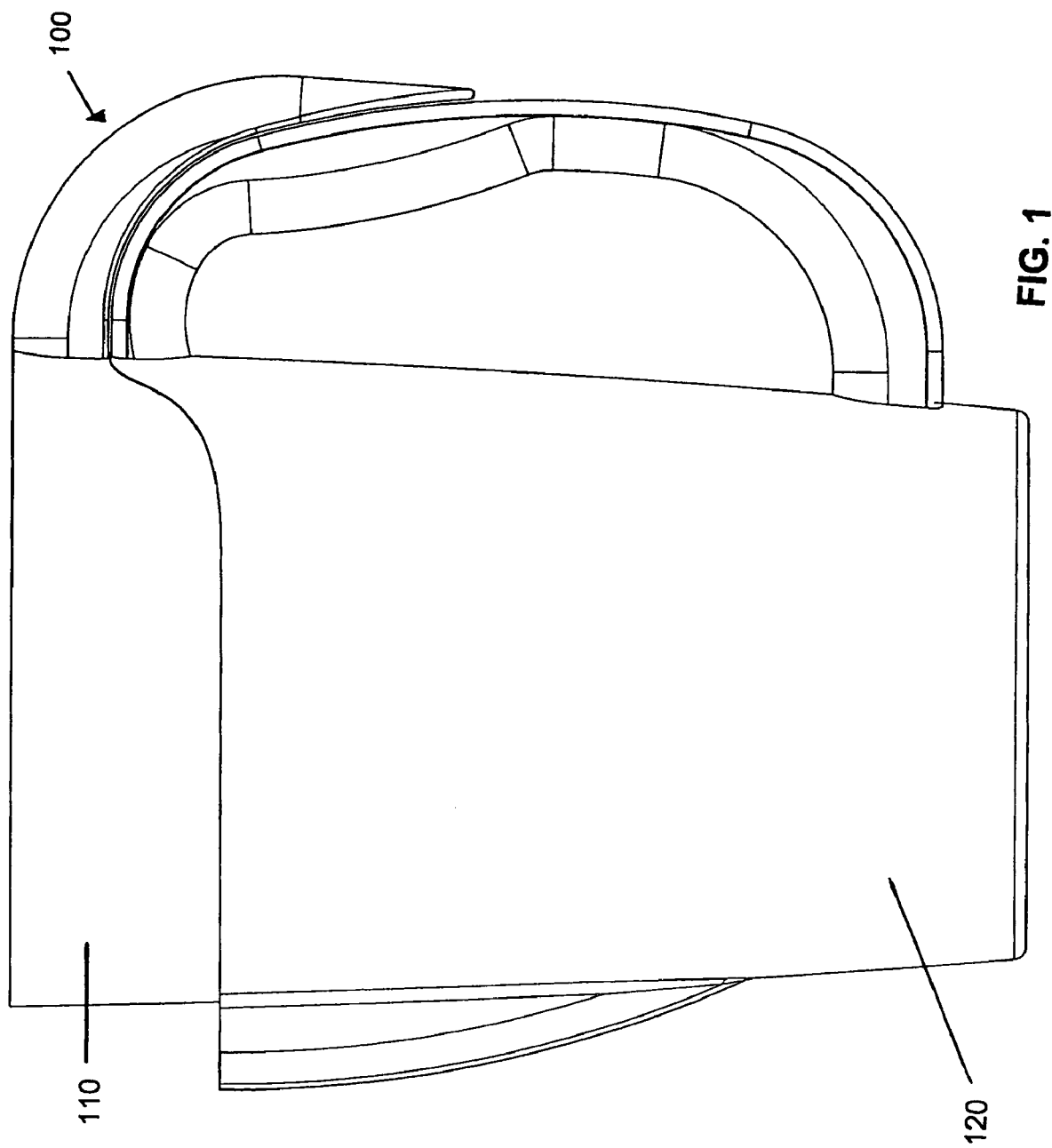
FIG. 1 is a side view of a drinking water pitcher according to an embodiment of the present invention showing upper and lower reservoirs in an assembled position.

A need was identified to have an upper reservoir that could detach from the rest of the water filtering device and more easily be put in a sink for filling. FIG. 1 is a side view of a drinking water pitcher 100 according to an embodiment of the present invention showing an upper reservoir 110 and a lower reservoir 120 in an assembled position. The upper reservoir 110 and the lower reservoir 120 are removably mated with one another.

Figure 2:
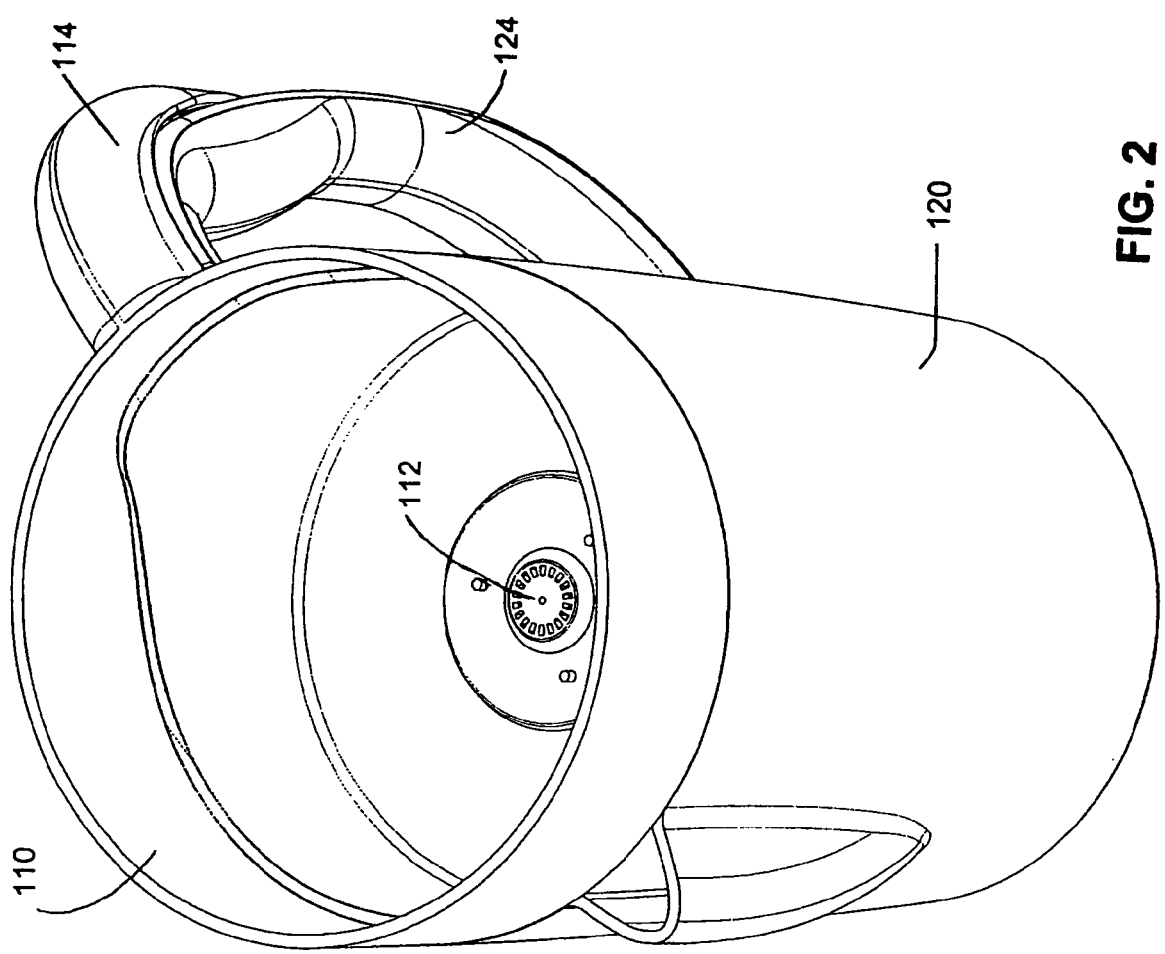
FIG. 2 is an isometric view of the drinking water pitcher of FIG. 1.

FIG. 2 is an isometric view of the drinking water pitcher of FIG. 1. As illustrated, embodiments of the present invention provide a removable upper reservoir 110 and a lower reservoir 120, the upper and lower reservoirs interfacing in such a way that, once assembled, water flow between the reservoirs is restricted. As shown in FIG. 2, the upper reservoir includes a water restriction means 112 to restrict water flow from the upper reservoir when the upper and lower reservoirs are not properly mated together. In other words, the water restriction means 112 can restrict the migration of water between the upper and lower chambers or reservoirs. The water restriction means 112 can restrict, or preferably prevent, water outflow from the upper reservoir 110 when the upper reservoir 110 is removed from the lower reservoir. The water restriction means 112 can be provided in a bottom surface of the upper reservoir 110.

Embodiments of the present invention provide an advantage in that the upper reservoir 110 can be removed for filling with water. This is advantageous in instances where a sink from which the water is to be obtained is small or shallow, or the sink contains some items in it, thereby effectively reducing the size of the sink. Traditional drinking water pitchers without a removable upper reservoir are difficult to manoeuvre in such instances. Either the traditional pitcher would not fit in such a sink or it would have to be tilted in order to pour the water into the pitcher, thereby reducing the total amount of water that can be poured into the pitcher due to it not being vertical during filling. The removable upper reservoir of the present invention can result in ease of use for the end user.

In known drinking water pitchers, some of those pitchers include an upper reservoir that can be removed, although it has not been designed to be removable. The result that it is difficult to remove because there is no handle or other means specifically provided to remove the upper reservoir. Moreover, since the filter itself is traditionally included in the upper reservoir, if one were to remove the upper reservoir for filling, the water would begin to pass through the filter and leak out the bottom, dripping onto the surface below and resulting in filtered water escaping in the process. This is evidence that such upper reservoirs are not intended to be removed from the lower reservoir.

This drawback is overcome by providing an interface for selective passage of water between the upper reservoir and the lower reservoir. This interface can include a water restriction means 112. The water restriction means can 112 be implemented in different manners according to embodiments of the present invention. For example, a presently preferred embodiment comprises, at the base of the upper reservoir, a dual check valve as an implementation of a water restriction means, which keeps the base of the upper reservoir sealed until it engages with the lower reservoir, at which time the dual check valve opens. This results in a transportable upper reservoir.

Essentially, any means for opening a water path can be provided in the base of the upper reservoir as a water restriction means 112. For example, the base-of the upper reservoir can include a sliding door which permits water flow when opened and restricts water flow when closed. In embodiments of the present invention in which the upper and lower reservoirs are joined by way of a twisting motion, when the upper reservoir is twisted in, this can actuate or push a water passage member that is sealed until the upper reservoir is properly twisted and seated in the lower reservoir. Essentially, any means that permits the opening of a door or a passageway between two water chambers can be provided. This can be implemented as a manual or mechanical implementation, or augmented by some electrical implementation.

In order to obtain the advantage of a transportable upper reservoir, the water restriction means 112 can be any type of check valve, or any type of valve. A water pump could also be used in order to pump water over the edge. With respect to a valve implementation, it is not necessary to provide a check valve. For example, a manual valve can be provided in order to restrict and allow water flow based on a user's actuation of the manual valve. The base would remain sealed until the manual valve is opened by the user. Alternatively, lower reservoir could include some sort of protrusion, or rod, that engages a valve in the upper reservoir to permit water flow into the lower reservoir once the upper reservoir is properly seated against the lower reservoir.

Figure 4:
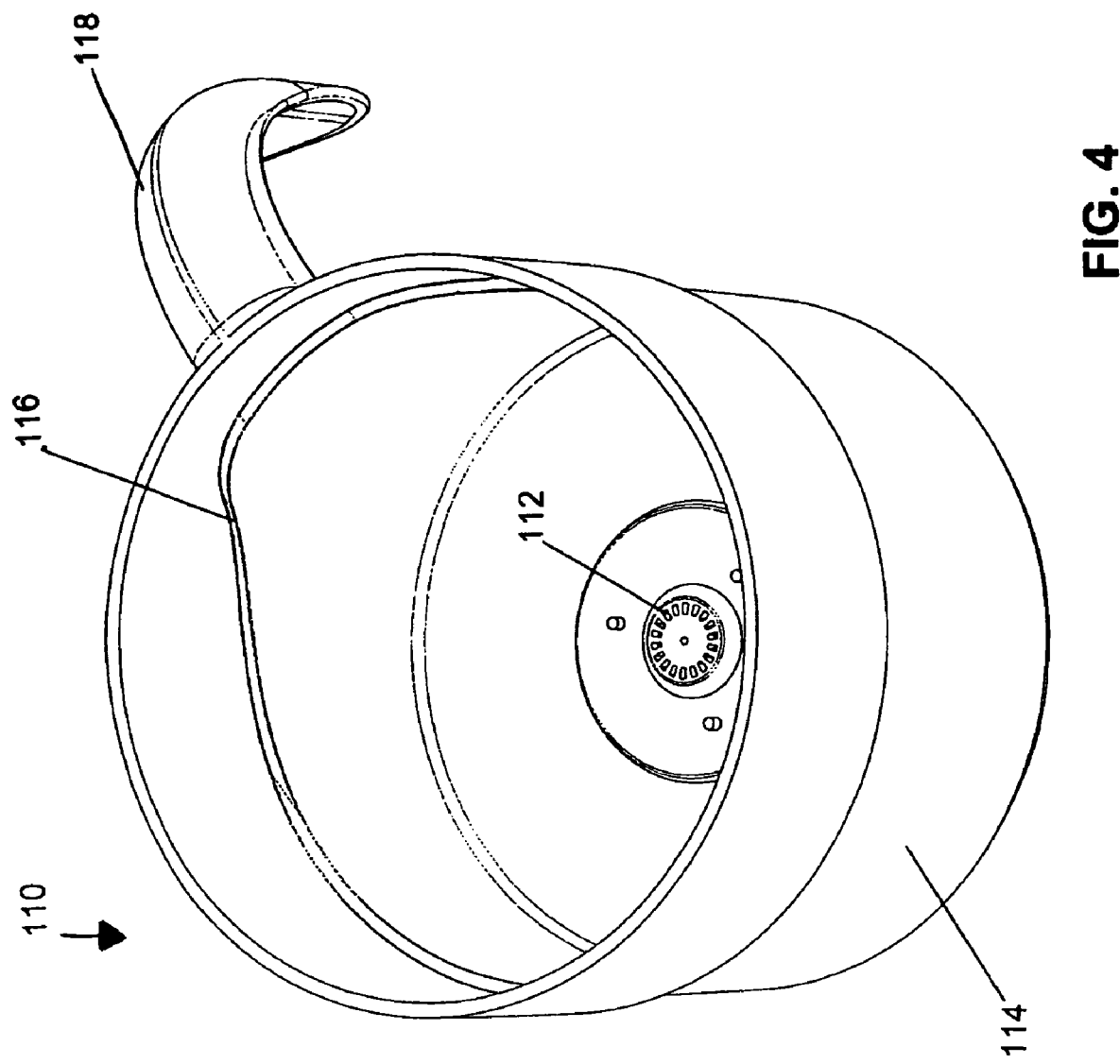
FIG. 4 is an isometric view of an upper reservoir of a drinking water pitcher according to an embodiment of the present invention.

The base of the upper reservoir in a presently preferred embodiment includes a dual check valve, such as shown in FIG. 2 and FIG. 4. This is particularly preferable in the system implementation with the base unit, which will be described later, in which case the dual check valve can mate with the receiving portion of the base unit. In such a system implementation, the geometry of the upper portion of the lower reservoir, including the filter, is substantially similar to the geometry of the receiving part of the base unit. The geometry of the check valve also mates with the filter housing to open and allow gravity pour through of water.

The upper reservoir can preferably be approximately the same size as traditional upper reservoirs, though other sizes are possible. According to embodiments of the present invention, the upper reservoir can be disassembled from the drinking water pitcher, thus making the upper reservoir itself smaller than other pitcher assemblies with non-removable upper reservoirs.

Figure 3:
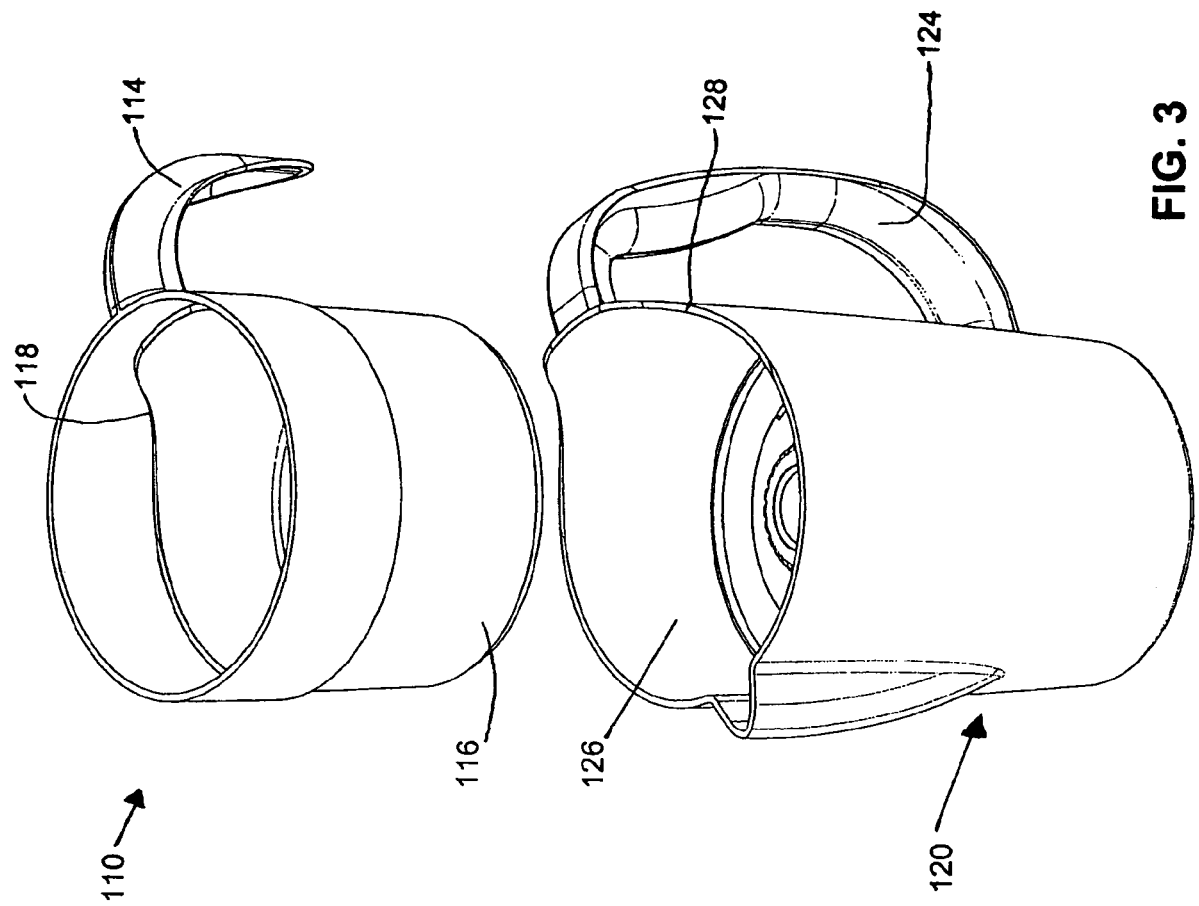
FIG. 3 is an exploded view of the drinking water pitcher of FIG. 1 with the upper and lower reservoirs in a detached position.

FIG. 3, which is an exploded view of the drinking water pitcher of FIG. 1 with the upper and lower reservoirs in a detached position.

As shown in FIGS. 1-3, among others, in order to provide for ease of removal of the removable upper reservoir from the drinking water pitcher, a gripping means is preferably provided in the upper reservoir. This gripping means can be implemented as indentations or any other formed shape in the side wall of the upper reservoir, in order to facilitate removal of the upper reservoir. In a presently preferred embodiment, the gripping means is a handle. FIG. 2 shows the upper reservoir 110 having an upper reservoir handle 114, and the lower reservoir 120 having a lower reservoir handle 124 to mate with the upper reservoir handle. There are many different manners in which a handle of the upper reservoir can mate with a handle of the lower reservoir. In the embodiment shown in FIGS. 1-3, the handle of the upper reservoir mates on top of the handle of the lower reservoir.

The upper reservoir as shown in FIG. 4 is smaller and easier to carry and fill. This is partly due to inclusion of a gripping means, implemented in this case as a handle as shown in the figure.

In the embodiment shown in FIGS. 12 and 13, which will be described later in further detail, the handle of the upper reservoir mates inside the handle of the lower reservoir. In alternative embodiments, the handle of the upper reservoir can mate with, or be received beside, the handle of the lower reservoir. Of course, any number of alternative arrangements is possible. In embodiments when a taper lock is used, such as the embodiment shown in FIG. 1, it is preferable to have the handle of the upper reservoir fit either on top of or beside the handle of the lower reservoir, in order to facilitate twisting to remove the upper reservoir.

In an embodiment, a lid can be provided for mating with the upper reservoir. The lid can include a gripping means, so that the user can remove the upper reservoir by gripping on the lid and pulling/twisting in an upwards motion. The lid would preferably include a means for engaging with the upper reservoir, such as by a snap or locking feature.

Of course, a lid with or without gripping means can be provided to removably mate with an upper reservoir, and/or a lower reservoir, according to an embodiment of the present invention.

As shown in FIGS. 2, 3 and 4, in a presently preferred embodiment the upper and lower reservoirs include mating portions. A bottom surface 116 of the upper reservoir can be shaped to be removably mated with a top surface 126 of the lower reservoir. In an embodiment, the bottom surface 116 of the upper reservoir and the top surface 126 of the lower reservoir can be complementary in shape.

One implementation of the mating portions is as a taper lock portion, or ramping portion, in each of the upper and lower reservoirs. In such a case, the ramping portions cooperate with each other, enabling detachment of the upper reservoir from the lower reservoir via a twisting motion of the upper reservoir. This can alternatively be described as the upper reservoir and lower reservoir being attachable in a taper lock relationship. In a presently preferred embodiment, the upper reservoir includes an upper reservoir taper lock portion 118 that mates with a lower reservoir taper lock portion 128 in the lower reservoir.

The mating ramping portions also permit the self location of the upper and lower reservoirs in proper mating position. The upper reservoir can removably mate with the lower reservoir in a number of alternative manners, such as in a snap-in arrangement, a twisting arrangement, a seating arrangement, or any other arrangement permitting the removable attachment of the upper and lower reservoirs. Therefore, embodiments of the present invention provide an upper and lower reservoir that are removably attachable from one another.

A means for mating the upper reservoir with the lower reservoir can be implemented as means preferably provided at the bottom of the upper reservoir to mate with the filter in the lower reservoir, in the case where the filter is housed in the lower reservoir.

Figure 5:
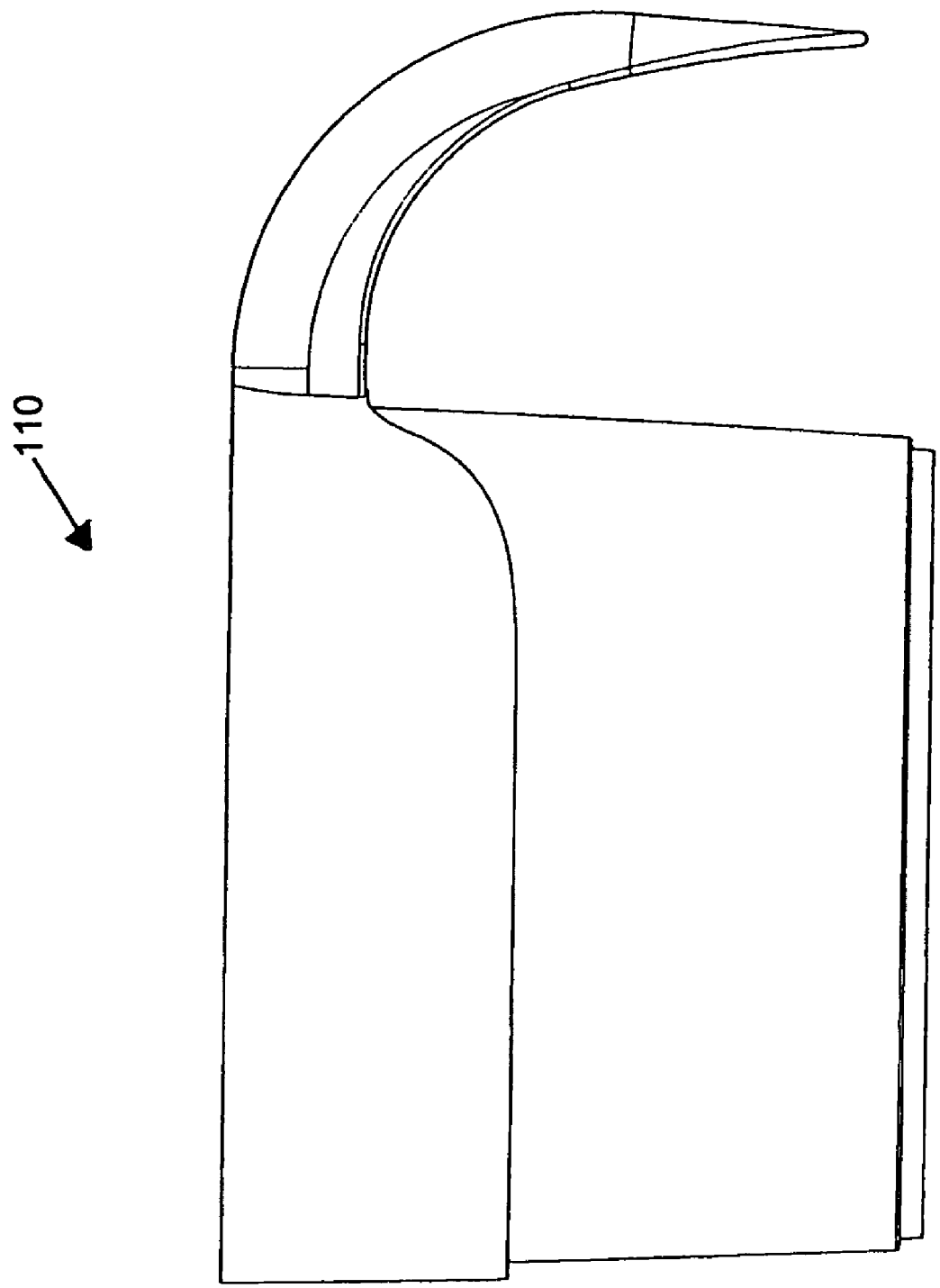
FIG. 5 is a side view of the upper reservoir of FIG. 4.

FIG. 4 is an isometric view of an upper reservoir of a drinking water pitcher according to an embodiment of the present invention, and FIG. 5 is a side view of the upper reservoir of FIG. 4.

Figure 6:
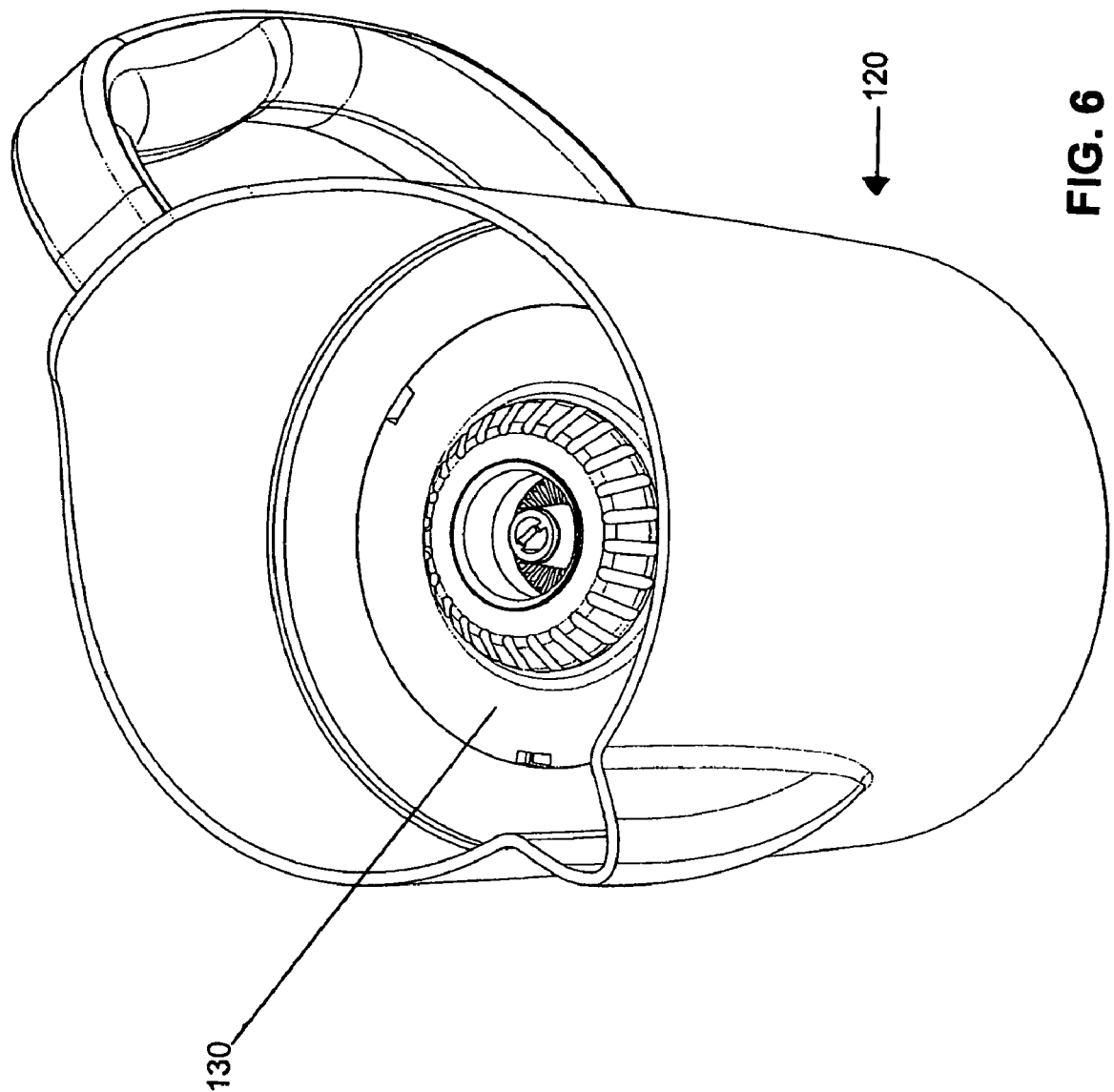
FIG. 6 is an isometric view of a lower reservoir of a drinking water pitcher according to an embodiment of the present invention.
Figure 7:
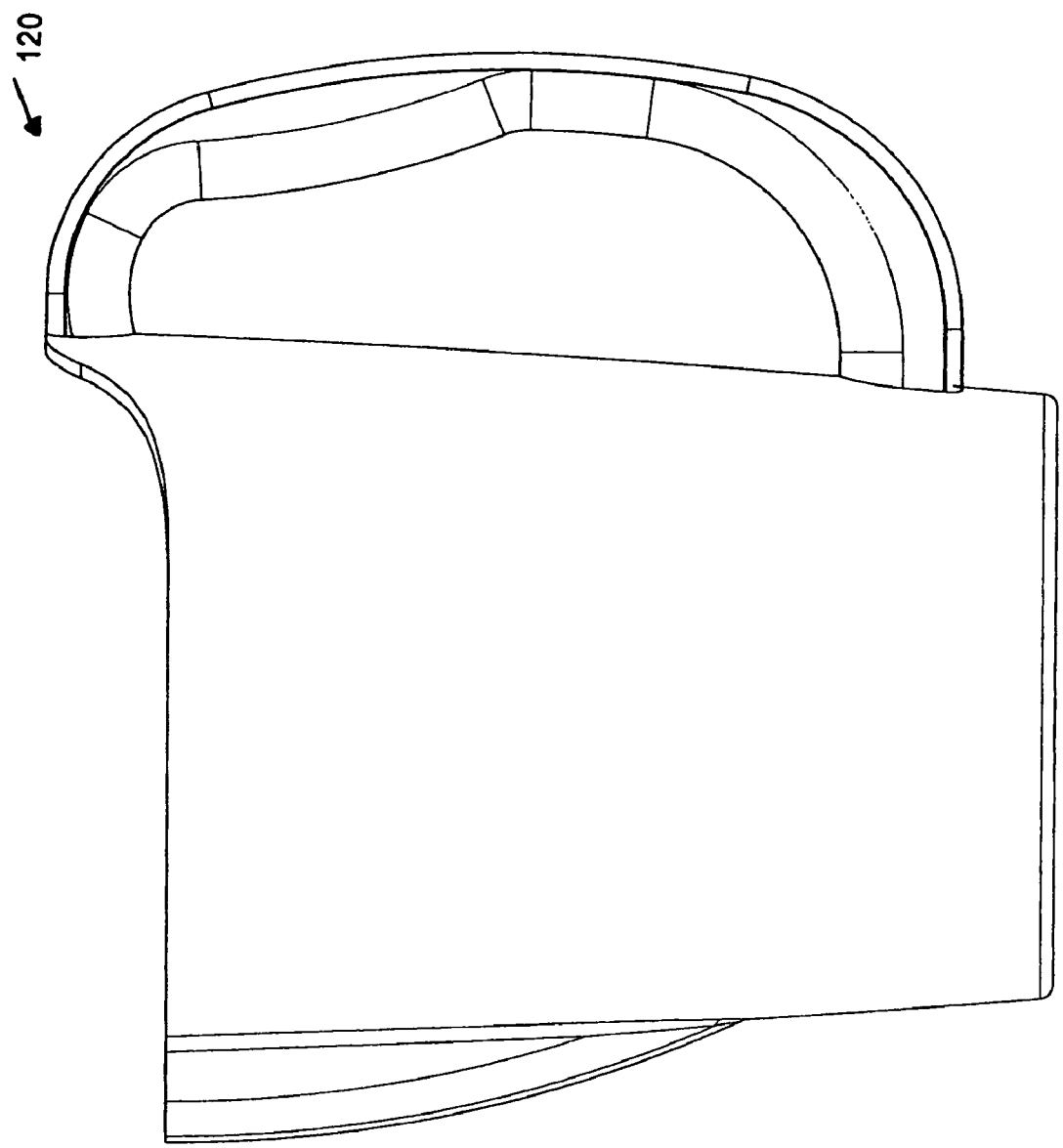
FIG. 7 is a side view of the lower reservoir of FIG. 6.

FIG. 6 is an isometric view of a lower reservoir of a drinking water pitcher according to an embodiment of the present invention. FIG. 7 is a side view of the lower reservoir of FIG.

6. In the embodiment shown in FIG. 6, a drinking water filter 130 is included in the lower reservoir. This is part of a drinking water pitcher having an upper reservoir removably matable with the lower reservoir. Implementing the filter 130 as part of the lower reservoir facilitates in providing a transportable and removable upper reservoir. In known approaches, the filter is implemented in the upper reservoir, and deters a user from removing the upper reservoir, since water immediately begins to pour through the filter. With the drinking water filter 130 provided in the lower reservoir 120, such a drawback is avoided.

The filter 130 can be a removable drinking water filter. In such a case, the filter 130 can include a filter housing, with a removable filter housed within. Consequently, an embodiment of the present invention includes a drinking water pitcher having a filter housing for housing a drinking water filter. That way, the drinking water pitcher can be provided with only the housing itself (with the filters provided separately), or the filters can be provided with the pitcher. In the case where a filter housing for a drinking water filter is provided in the lower reservoir 120, the filter housing is preferably complementary in shape to the water restriction means in the upper reservoir 110.

FIG. 6 illustrates that when the upper reservoir is removed, the filter housing preferably remains in the lower reservoir. This means that the smaller upper reservoir is easier to carry and fill in a sink of water than existing water jugs. It can still, however, process the same volume of water. The geometry of the filter housing preferably mates with the geometry of a water restriction means, for example a dual check valve, in the upper housing and allows for gravity flow through of water. With respect to FIG. 7, it can be noted that when the filter process is complete, the upper reservoir can be removed. This means that the lower reservoir is smaller and more easily stored (e.g. in a refrigerator). If the consumer wishes, the upper reservoir can be retained on top of the lower reservoir after processing, simply to keep the components together.

In a particular embodiment, the filter can be removably attached to, or integrated with, the lower reservoir. Removable attachment of the filter with the lower reservoir can be accomplished by any number of approaches, such as snap-in lock, friction lock, taper lock, or any other suitable manner of removable attachment. In another embodiment, a lower portion of the filter can be integral with the lower reservoir, with an upper portion of the filter being removable for easy replacement of the filter media.

Figure 8:
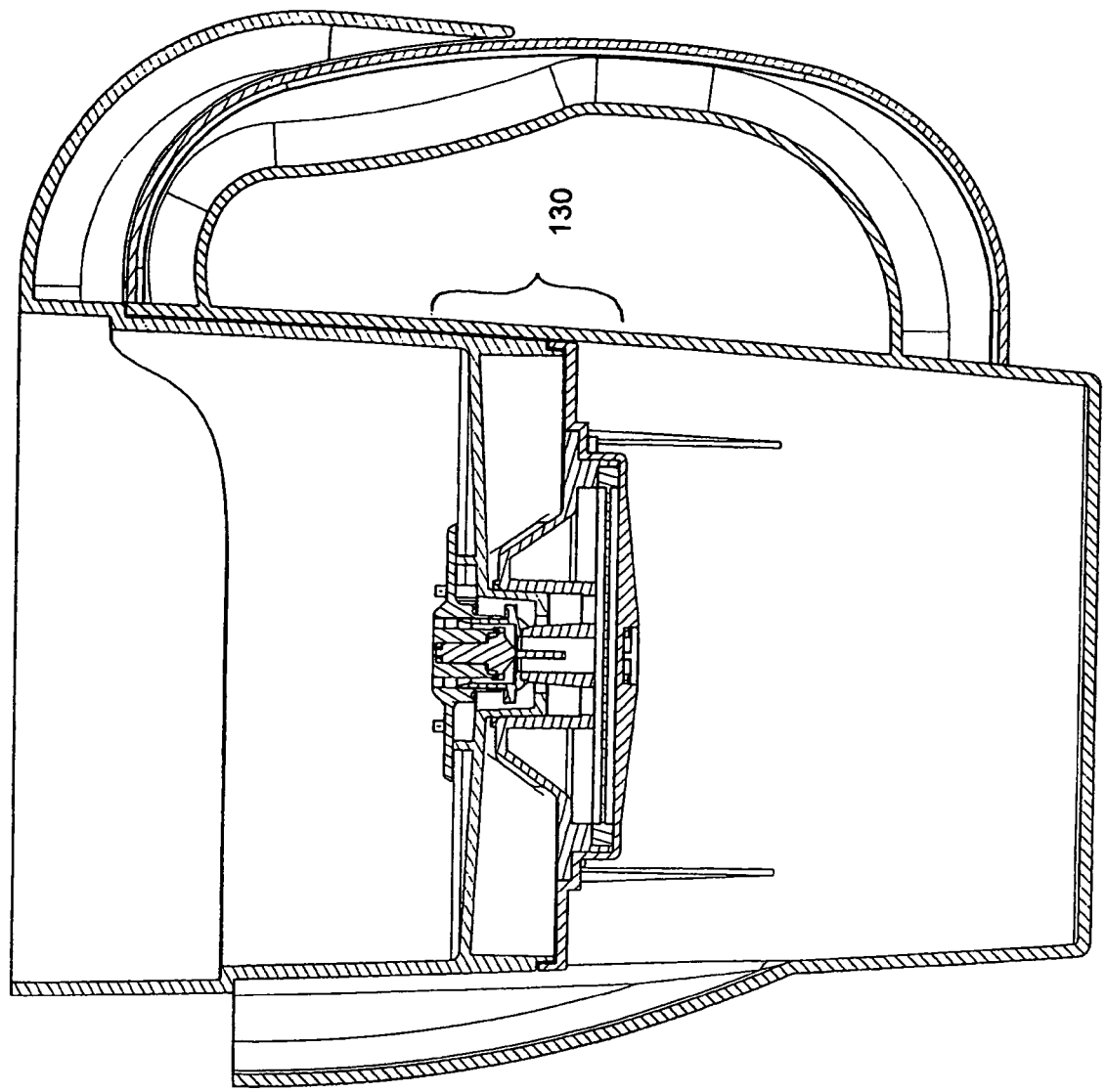
FIG. 8 is a side section view of a drinking water pitcher according to an embodiment of the present invention.

FIGS. 3, 4, 6 and 8 illustrate an embodiment of the present invention with a particular filter arrangement. This filter arrangement is described in co-pending U.S. Provisional Patent Application Ser. No. 60/645,073, filed Jan. 21, 2005 and entitled "Filter Housing For Drinking Water Filtration", which is incorporated herein by reference. However, the lower reservoir can include any manner of suitable filter. FIG. 8 is a side section view of a drinking water pitcher according to an embodiment of the present invention, and shows an implementation of a filter, or filter housing, 130 using a flat carbon-fiber filter media.

Figure 9:
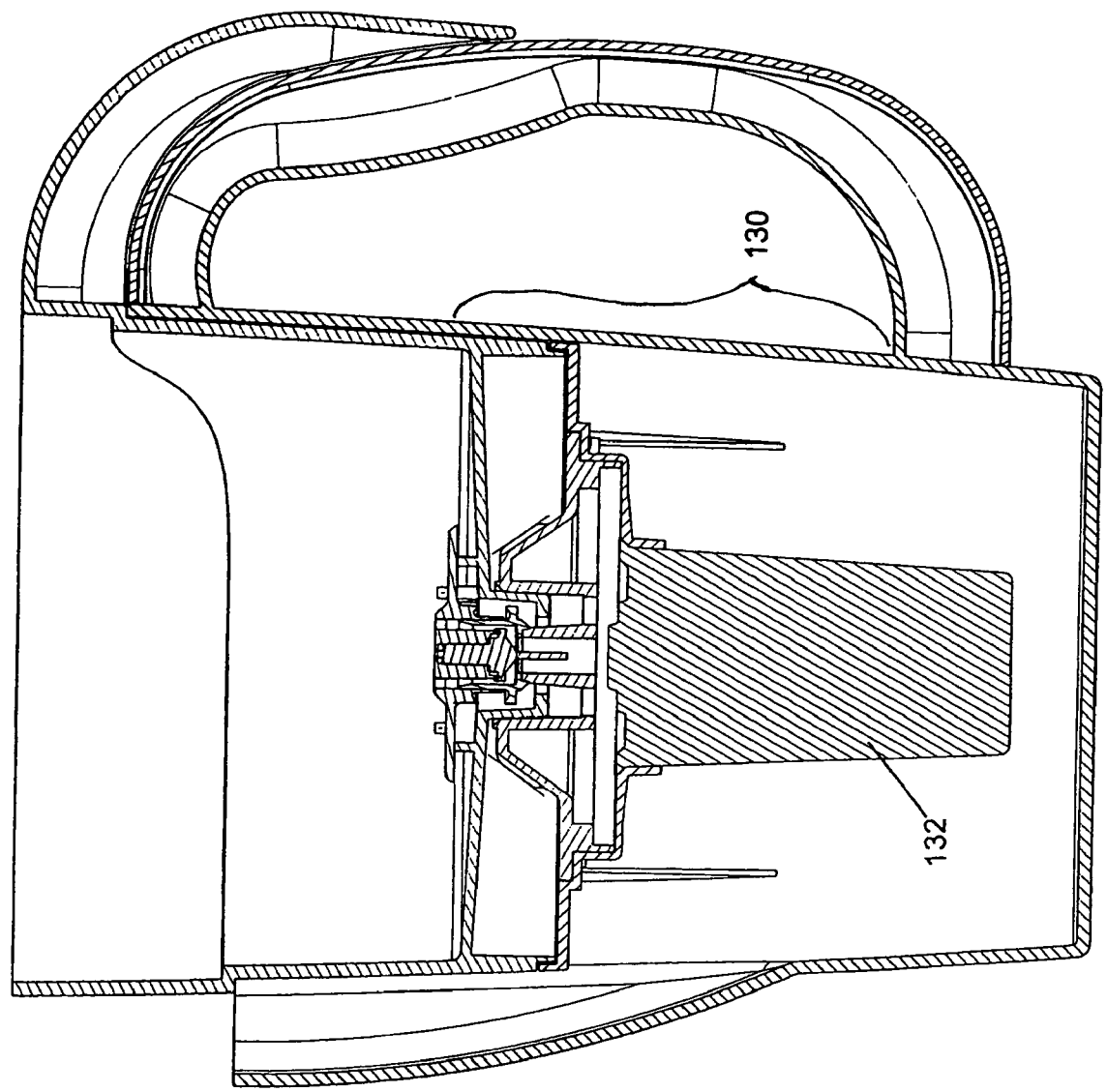
FIG. 9 is a side section view of a drinking water pitcher according to another embodiment of the present invention.

FIG. 9 is a side section view of a drinking water pitcher according to another embodiment of the present invention, which illustrates an embodiment in which the lower reservoir includes a filter housing 130 having a Granulated Active Carbon (GAC) filter 132, such as those commonly used in Brita® drinking water pitchers.

Any shape of filter media housing and any type of filter media can be used. For example, the filter can include a two stage or multi-stage filter, with variations being possible in the type of filter used in each stage.

Figure 10:
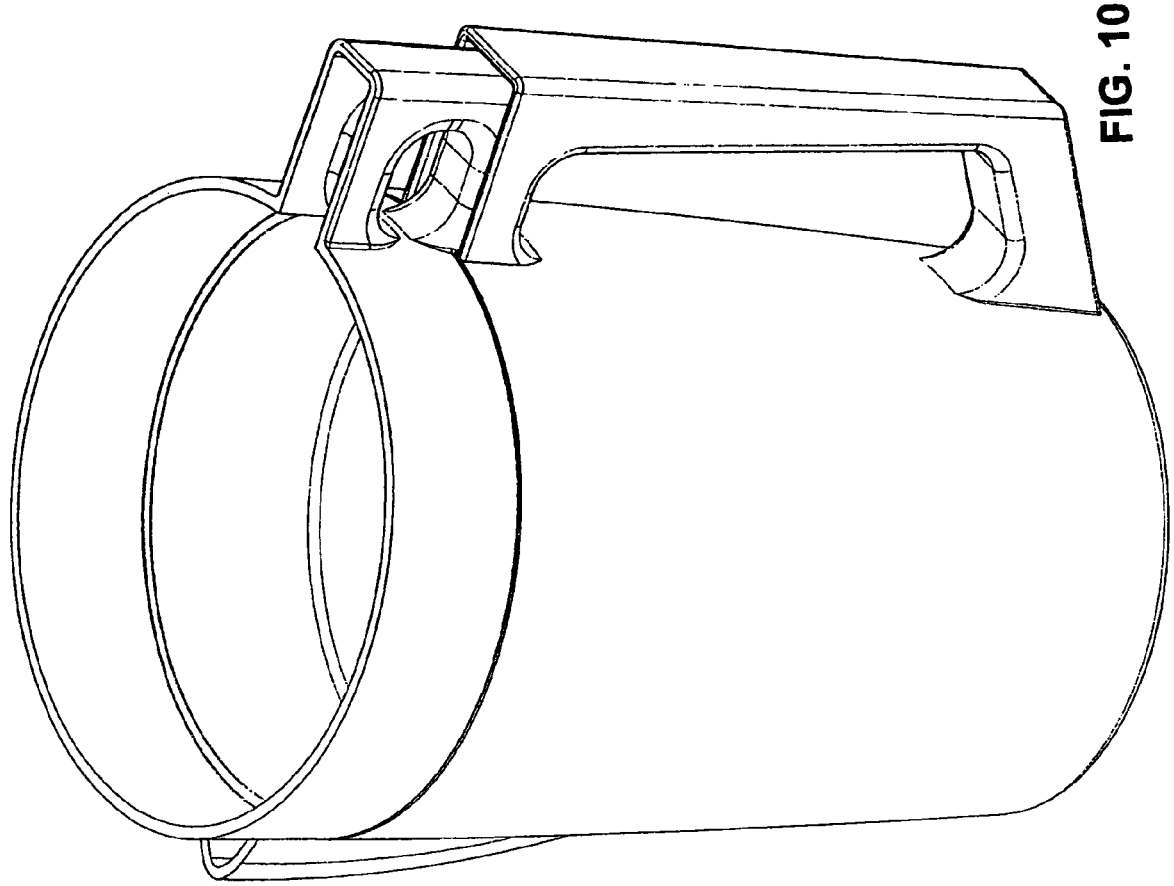
FIG. 10 is an isometric view of a drinking water pitcher according to another embodiment of the present invention showing upper and lower reservoirs in an assembled position.
Figure 11:
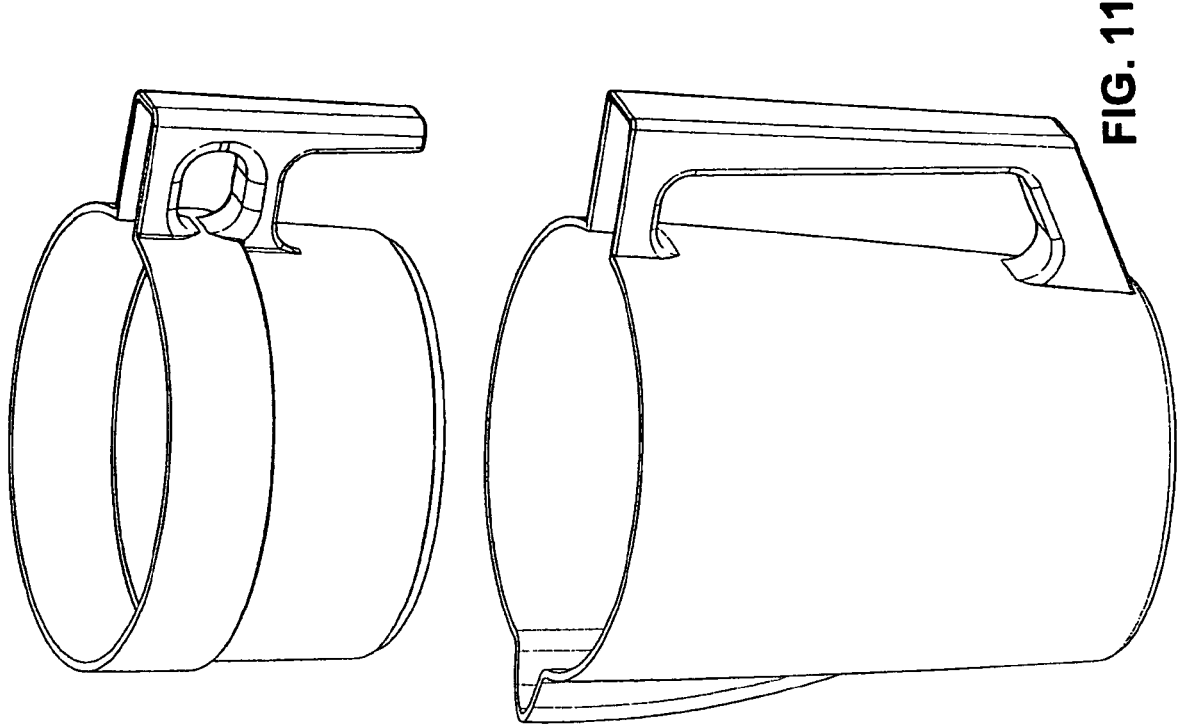
FIG. 11 is an exploded view of the drinking water pitcher of FIG. 10 with the upper and lower reservoirs in a detached position.

FIG. 10 is an isometric view of a drinking water pitcher according to another embodiment of the present invention showing upper and lower reservoirs in an assembled position. In this embodiment, the handle of the upper reservoir mates inside the handle of the lower reservoir. The handle of the upper reservoir has a different shape and different characteristics than the handle shown in FIG. 1, including a closed gripping area. FIG. 11 is an exploded view of the drinking water pitcher of FIG. 10 with the upper and lower reservoirs in a detached position, showing further details of different possibilities with respect to variations in handle size and shape, upper reservoir shape, and differences in mating portions, or mating structures.

Figure 12:
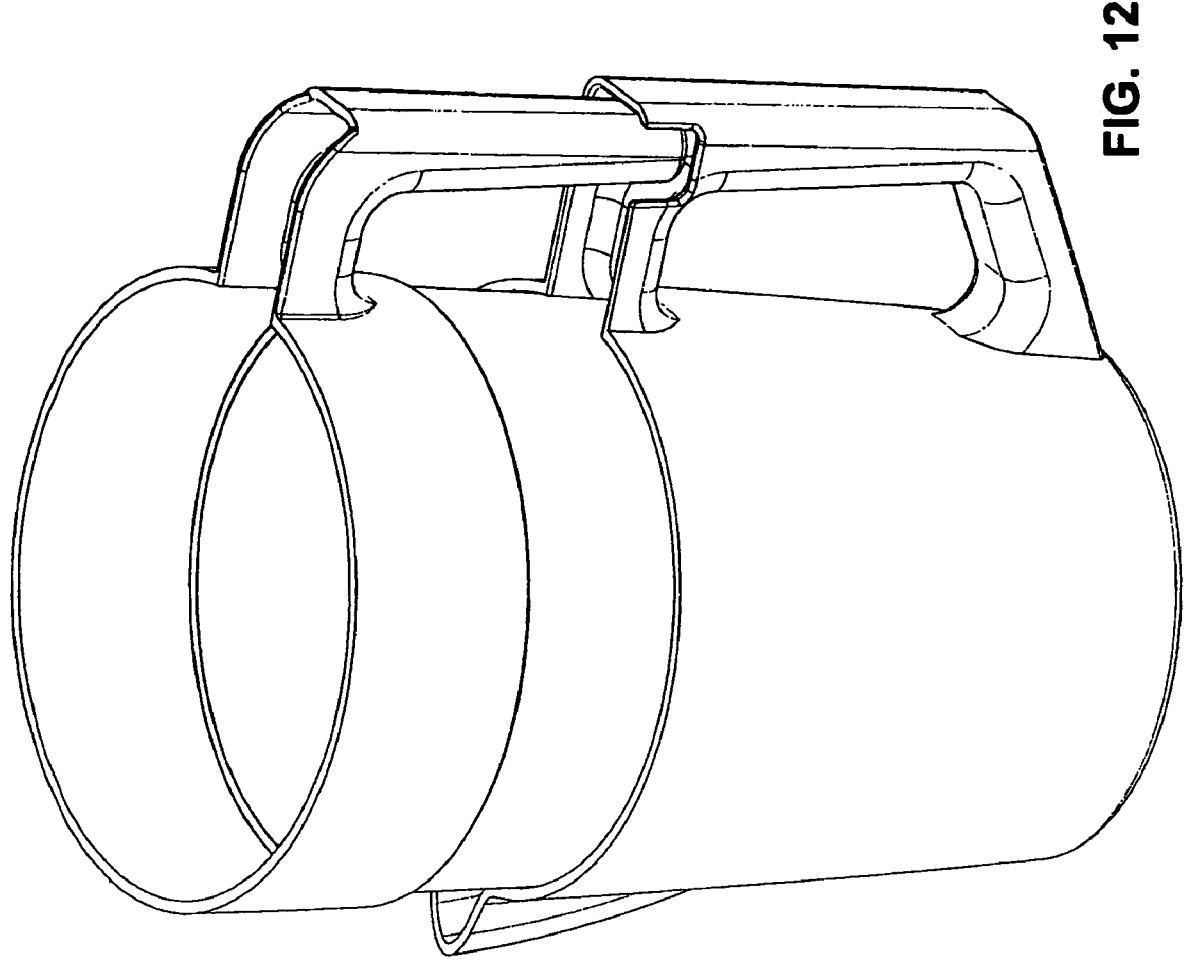
FIG. 12 is an isometric view of a drinking water pitcher according to a further embodiment of the present invention showing upper and lower reservoirs in an assembled position.

FIG. 12 is an isometric view of a drinking water pitcher according to a further embodiment of the present invention showing upper and lower reservoirs in an assembled position. In the embodiment of FIG. 12, the upper reservoir is not substantially housed within the lower reservoir. The upper reservoir is simply provided such that the bottom of the upper reservoir mates with the top of the lower reservoir without substantial overlap of the upper reservoir within the lower reservoir. The upper reservoir essentially sits on top of the lower reservoir, or is flush with the lower reservoir. The upper reservoir is completely removable, and the lower reservoir can be stored in a refrigerator while taking up much less space because of the removability and substantial non-overlapping of the upper reservoir. Of course, the lower reservoir need not be a reservoir destined for refrigeration. For example, the lower reservoir can be made of a suitable material for housing coffee or another hot liquid. The upper reservoir can be removed and the lower reservoir can be used for serving the filtered liquid. Although the lower reservoir in the embodiment of FIG. 12 takes up much less space height-wise in terms of placement in a refrigerator or in another environment, this lower reservoir preferably holds the same volume of water as the lower reservoir in other embodiments of the present invention. In the embodiment shown in FIG. 12, the volume of the upper reservoir is substantially similar to the volume of the lower reservoir.

Drinking Water Pitcher as Part of System with Base Unit

Other multi-stage water filtration devices in the art generally consist of filters combined with some core process for removal of bacteria and microbiological organisms such as ozone, UV or reverse osmosis. However these products tend to be completely self-contained and do not allow for any flexibility in their process. They also tend to be expensive and limited in their ease of use. A product sold under the name Calypso is an example of this where water is poured into a reservoir. The reservoir is placed on a unit and then the filtering process is started. Once the process has been initiated the water can no longer be removed from the system until the cycle has been completed. A need was determined that would allow a person to decide if the water they want to process only needs to be filtered or whether it should go through multiple processes such as filtration combined with other processes such as ozone, UV or reverse osmosis.

Water filtration plants have been using the combined process of ozonizing and filtering municipal water to make it safe to drink for over a century. The idea of having a small appliance that has the ability to re-circulate and ozonize water is also known in the art. There are many other known methods by which bacteria and microbiological organisms can be removed from water (e.g. UV, reverse osmosis, chemical). Brita and other product suppliers have been using the technology of gravity flow water filtration in "pitcher-style" water filtration devices for decades. These technologies are well known in the art but never before have they been combined in a convenient, flexible and cost-effective product for the home.

Also known are in-line under the counter filters, such as ultraviolet filters, which typically include a reservoir tank and may include more than one type of filtration or purification. However, such systems are extremely costly and very cumbersome in their size.

Figure 13:
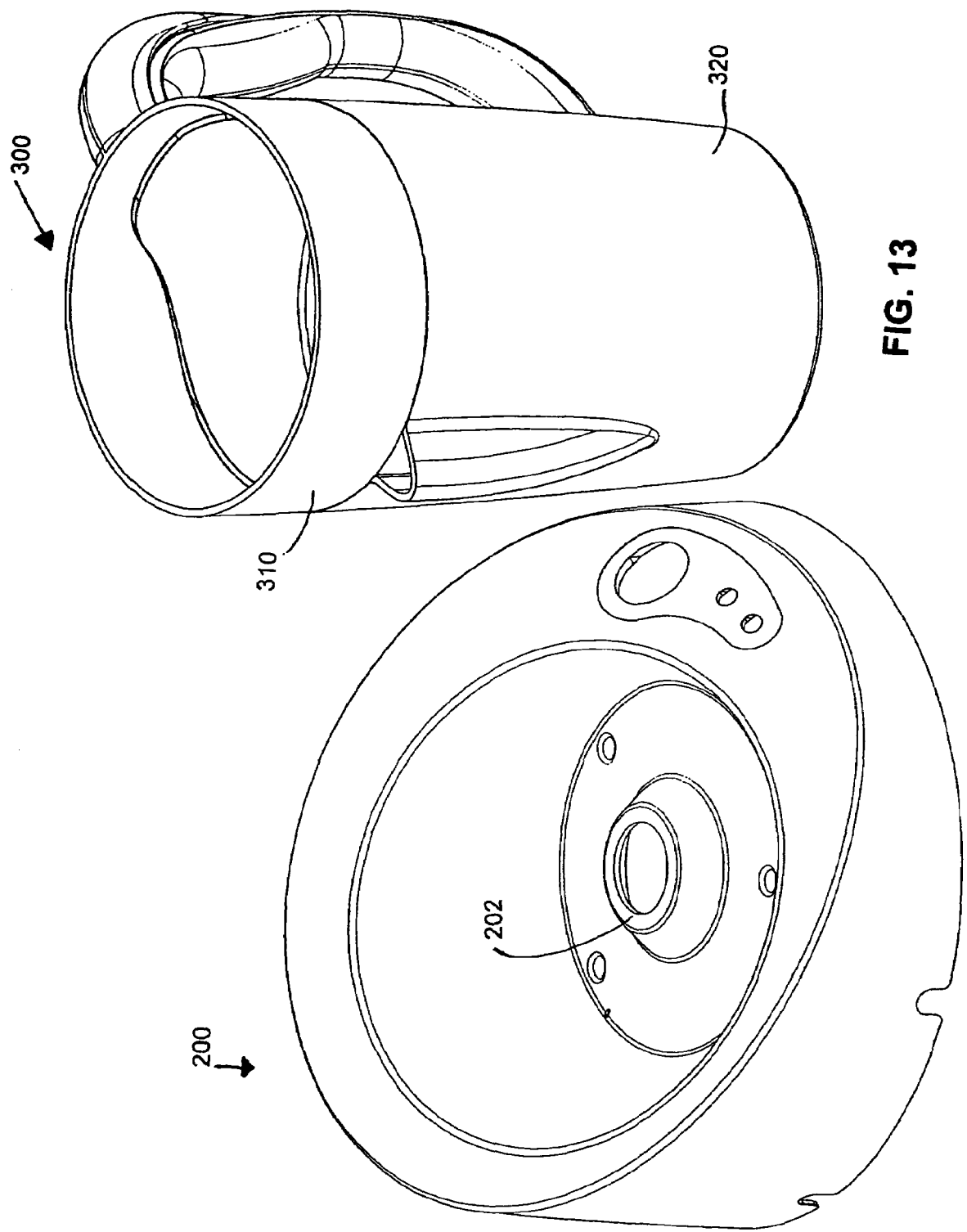
FIG. 13 illustrates a drinking water pitcher and a base unit according to an embodiment of the present invention.

FIG. 13 illustrates a drinking water pitcher used with a base unit according to an embodiment of the present invention. The embodiment of FIG. 13 can be described as a drinking water system including a base unit 200 and a drinking water pitcher 300. The drinking water pitcher 300 includes a lower reservoir 320 and an upper reservoir 310 shaped to be removably mated with the lower reservoir 320 and with the base unit 200. A base of the upper reservoir can include a mating structure to mate with a top surface of the lower reservoir, and to mate with a top surface of the base unit. The top surface of the base unit 200 can include a mating structure 202 to mate with the upper reservoir mating structure. In an embodiment, a base of the lower reservoir can include a mating structure to mate with a top surface of the base unit.

Figure 14:
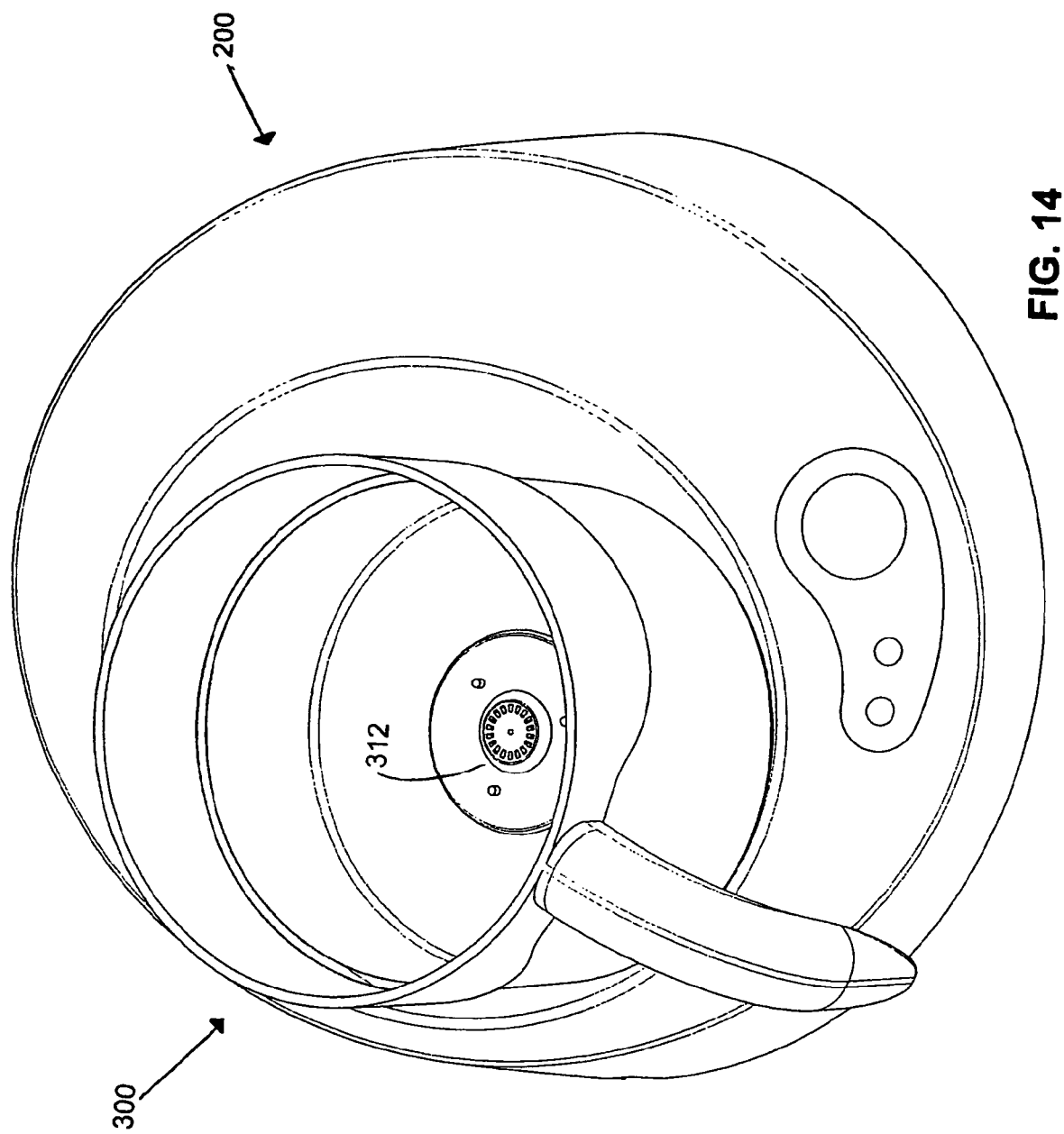
FIG. 14 illustrates an upper reservoir according to an embodiment of the present invention used with a base unit.

FIG. 14 illustrates an upper reservoir 310 according to an embodiment of the present invention used with a base unit 200, with the upper reservoir shown being removably mated with the base unit. The upper reservoir can further include a water restriction means 312 to restrict, or prevent, water outflow from the upper reservoir when it is removed from the base unit 200, or from the lower reservoir 320. The lower reservoir 320 can include a filtering means for filtering drinking water.

Such embodiments can be described as a drinking water system including: a base unit 200 and a drinking water pitcher 300. The drinking water pitcher 100 includes a lower reservoir 320 removably mated with the base unit 200. The drinking water pitcher also includes an upper reservoir 310 having a first in-use position when removably mated with the lower reservoir 320 and a second in-use position when removably mated directly with the base unit 200.

In embodiments of the drinking water system, the upper and lower reservoirs of the drinking water pitcher can have various features as previously described with respect to aspects of the drinking water pitcher embodiments.

The base unit 200 can include a sanitizing means for sanitizing drinking water. With reference to FIG. 14, the upper reservoir can mate with a base unit, such as an ozonation unit, or sanitization system, discussed in any one of applicant's published international (PCT) applications WO 2004/063098, WO 2004/063100, and WO 2004/113232, each of which is incorporated herein by reference. This permits the use of the upper reservoir with another water treatment, or sanitization, system and permits this type of water treatment prior to the filtration performed by the filter in the lower reservoir. The base unit can perform any sanitization process, such as a microbiological process, or any similar process.

Of course, this is one preferred embodiment of the present invention. It is not necessary to have additional processing performed on the water in the upper reservoir prior to having it flow through the filter in the lower reservoir. Nevertheless, embodiments of the present invention provide for enhanced flexibility.

Embodiments of the present invention relate to an apparatus for purifying drinking water including an upper reservoir, a lower reservoir and a filter housing with filter media inside of it. The upper reservoir is detachable and transportable for filling with water. The water filled upper reservoir can then advantageously be attached to a base unit that is, for example, capable of processing the water so as to kill bacteria and micro-biological organisms. The water filled upper reservoir can then be detached from the base unit and reattached to the filter housing to allow gravity flow filtering of the water through it and into the lower reservoir. This two step process allows for superior removal of harmful chemicals and bacteria in water.

Figure 15:
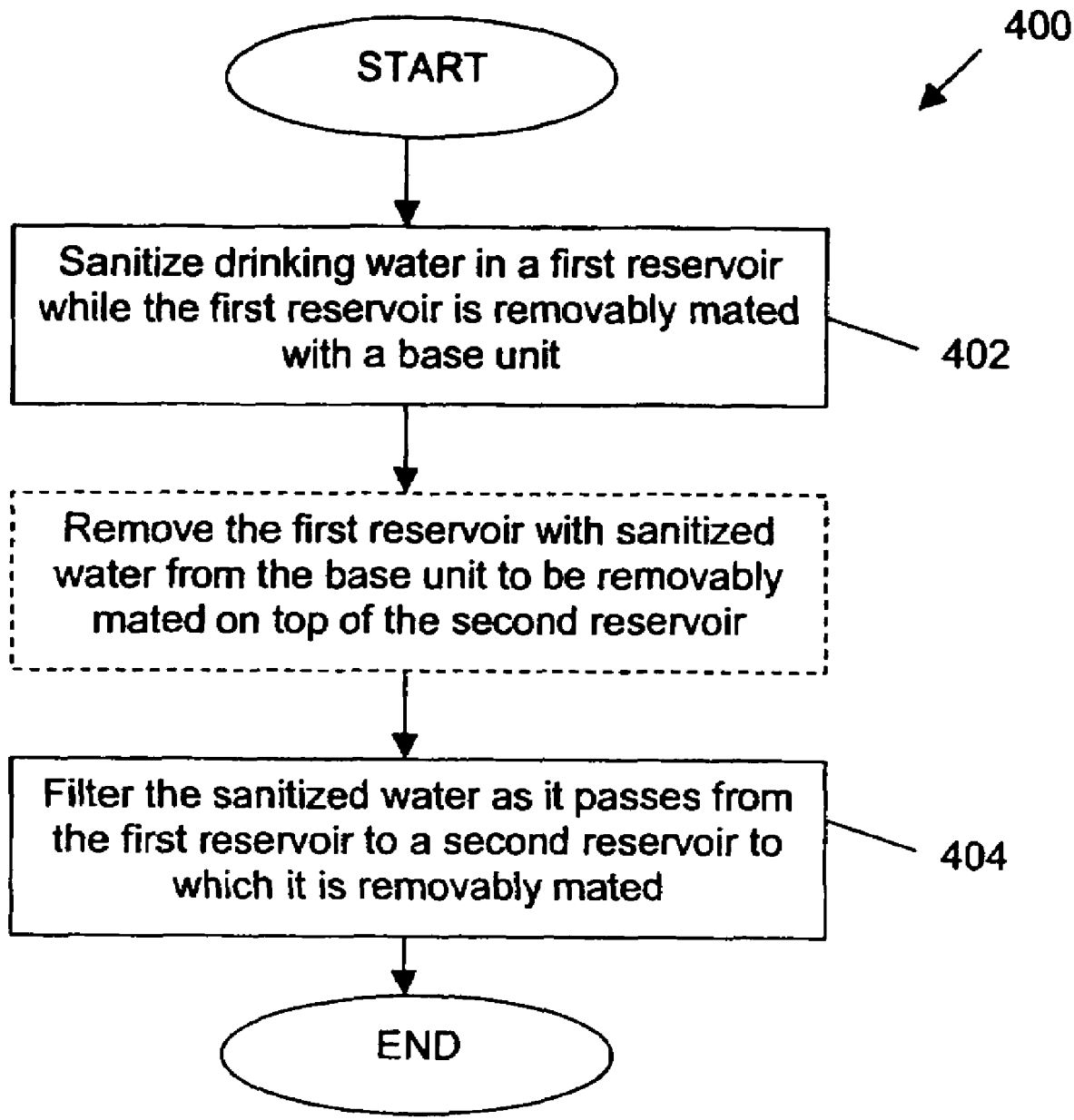
FIG. 15 illustrates a method of purifying drinking water according to an embodiment of the present invention.

FIG. 15 illustrates a method of purifying drinking water according to an embodiment of the present invention. The method 400 includes a step 402 of sanitizing drinking water in a first reservoir while the first reservoir is removably mated with a base unit. The method further includes a step 404 of filtering the sanitized water as it passes from the first reservoir to a second reservoir to which it is removably mated. While the individual steps of sanitizing and filtering are each beneficial with respect to drinking water, the combination of these two steps is referred to herein as purifying drinking water.

The step 402 of sanitizing drinking water can include ozonating drinking water. The method can further include, prior to the step of filtering, the step of removing the first reservoir with sanitized water from the base unit to be removably mated on top of the second reservoir.

Described in another way, embodiments of the present invention provide an advancement in the method by which purified drinking water can be made from regular municipal tap water. An embodiment of the present invention includes a lower reservoir with a filter housing installed inside it, removably attached to it, or integral with it. Attachable to the filter housing is an upper reservoir. This upper reservoir can be easily removed from the assembly and filled with water. Then the upper reservoir can be mounted to a device, such as a base unit, to add dissolved ozone to the water and kill unwanted bacteria and microbiological organisms in the water. After the ozone process is complete, the upper reservoir is detached from the ozone adding device and reconnected to the filter housing. The water is passed through the housing and filter, and into the lower reservoir.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A drinking water system comprising:
 a base unit having a top surface; and
 a drinking water pitcher, the drinking water pitcher including:
  a lower reservoir having a top surface; and
  a removable upper reservoir having a base, the upper reservoir shaped to be removably mated with the lower reservoir and with the base unit, the base of the upper reservoir comprising:
   a mating structure to removably mate with the top surface of the lower reservoir, and to removably mate with the top surface of the base unit, the upper reservoir further comprising:
    a water restriction means to prevent water outflow from the upper reservoir when it is removed from the lower reservoir or from the base unit.

2. The drinking water system of claim 1, wherein the base unit comprises a sanitizing means for sanitizing drinking water.

3. The drinking water system of claim 1, wherein the lower reservoir comprises a filtering means for filtering drinking water.

4. The drinking water system of claim 1, wherein a base of the lower reservoir comprises a mating structure to mate with a top surface of the base unit.

5. The drinking water system of claim 1, wherein the upper reservoir further comprises a gripping means.

6. The drinking water system of claim 5, wherein the gripping means comprises a closed gripping area.

7. The drinking water system of claim 1, wherein the upper reservoir further comprises an upper reservoir handle and the lower reservoir further comprises a lower reservoir handle to mate with the upper reservoir handle.

8. The drinking water system of claim 1, wherein the water restriction means automatically prevents water flow when the upper reservoir is removed from the lower reservoir or from the base unit.

9. A method of purifying drinking water, comprising:
sanitizing drinking water in a first reservoir while the first reservoir is directly mated with a base unit;
removing the reservoir with sanitized water from the base unit mating the first reservoir on top of the second reservoir;
filtering the sanitized water as it passes from the first reservoir to the second reservoir to which it is removably mated and preventing the outflow of water from the first reservoir via a water restriction means when the first reservoir is removed from the second reservoir or from the base unit.

10. The method of claim 9, wherein the step of sanitizing drinking water comprises ozonating drinking water.

* * * * *

UNITED STATES PATENT AND TRADEMARK OFFICE
CERTIFICATE OF CORRECTION

PATENT NO. : 7,513,278 B2  Page 1 of 1
APPLICATION NO. : 11/335501
DATED : April 7, 2009
INVENTOR(S) : Steve L. Hengsperger et al.

It is certified that error appears in the above-identified patent and that said Letters Patent is hereby corrected as shown below:

Sheet 4, Fig. 4. delete "114" and insert therefor --116--
Sheet 4, Fig. 4. delete "116" and insert therefor --118--
Sheet 4, Fig. 4. delete "118" and insert therefor --114--

Column 9, line 33, delete "100" and insert therefor --300--

Signed and Sealed this
Thirty-first Day of January, 2012

David J. Kappos
*Director of the United States Patent and Trademark Office*